US010111530B1

(12) United States Patent
Kramer et al.

(10) Patent No.: US 10,111,530 B1
(45) Date of Patent: Oct. 30, 2018

(54) ADJUSTABLE MATTRESS FOUNDATION AND PROCESS OF USE

(71) Applicant: Dreamwell, Ltd., Atlanta, GA (US)

(72) Inventors: Kenneth L. Kramer, Greensburg, IN (US); Jeffrey M. Woodall, Greenfield, IN (US); Francis Jan, Atlanta, GA (US)

(73) Assignee: DREAMWELL LTD, Atlanta, GA (US)

( * ) Notice: Subject to any disclaimer, the term of this patent is extended or adjusted under 35 U.S.C. 154(b) by 15 days.

(21) Appl. No.: 15/692,015

(22) Filed: Aug. 31, 2017

(51) Int. Cl.
| | |
|---|---|
| *A47C 20/08* | (2006.01) |
| *A47C 20/04* | (2006.01) |
| *A47C 19/02* | (2006.01) |
| *F16B 12/56* | (2006.01) |
| *F16B 12/44* | (2006.01) |
| *F16K 31/44* | (2006.01) |
| *A47C 31/12* | (2006.01) |

(52) U.S. Cl.
CPC .............. *A47C 20/08* (2013.01); *A47C 19/02* (2013.01); *A47C 20/04* (2013.01); *F16B 12/44* (2013.01); *F16B 12/56* (2013.01); *F16K 31/44* (2013.01); *A47C 31/123* (2013.01)

(58) Field of Classification Search
CPC ...................................................... A47C 20/08
USPC ............................................. 5/412, 613–618
See application file for complete search history.

(56) References Cited

U.S. PATENT DOCUMENTS

| | | | | |
|---|---|---|---|---|
| 4,696,071 | A | * | 9/1987 | Santo .................. A47C 27/085 5/400 |
| 5,870,784 | A | | 2/1999 | Elliott |
| 6,006,379 | A | | 12/1999 | Hensley |
| 6,276,011 | B1 | * | 8/2001 | Antinori ............. A47C 20/041 5/613 |
| 6,393,641 | B1 | | 5/2002 | Hensley |
| 6,557,198 | B1 | | 5/2003 | Gladney et al. |
| 7,036,166 | B2 | | 5/2006 | Kramer et al. |
| 7,930,780 | B2 | | 4/2011 | Clenet |
| 8,418,290 | B2 | | 4/2013 | Shih |
| 8,640,285 | B2 | | 2/2014 | Heimbrock et al. |
| 8,806,682 | B2 | | 8/2014 | Hornbach et al. |
| 9,049,942 | B2 | | 6/2015 | Huang |
| 2014/0075674 | A1 | | 3/2014 | Chun et al. |
| 2014/0250599 | A1 | * | 9/2014 | Cassell .................. A61G 7/015 5/613 |
| 2016/0262548 | A1 | | 9/2016 | Broom et al. |

* cited by examiner

*Primary Examiner* — Fredrick C Conley
(74) *Attorney, Agent, or Firm* — Cantor Colburn LLP

(57) ABSTRACT

Adjustable mattress foundations generally include a mattress support surface including a head and back section hingedly connected to an intermediate seat section at one end and a leg and foot section hingedly connected to the intermediate seat section at another end. The intermediate seat section includes spaced apart upper and lower panels, wherein the lower panel is hingedly connected to the head and back section and slideably engaged with side frame members of the foundation, and wherein the upper panel is stationary and hingedly connected to the leg and foot section. A linear actuator is operatively coupled to a linkage assembly to independently effect inclination or declination of the head and back section relative to the intermediate seat section and is further operative to effect an increase or decrease in a length of the intermediate seat section by movement of the lower panel relative to the upper panel.

15 Claims, 11 Drawing Sheets

ADJUSTABLE MATTRESS FOUNDATION AND PROCESS OF USE

BACKGROUND

The present disclosure generally relates to mattress assemblies, and more particularly, to adjustable support legs for foundations for mattress assemblies.

Foundations for mattress assemblies are used in the healthcare field and in residential applications. A typical foundation includes a base and a mattress frame or support, which can be divided into a head and back section, an intermediate seat section, and a leg and foot section. Some foundations include adjustable sections, also referred to as articulating mattress assemblies, wherein the various mattress frame sections are pivotally interconnected and have a continuous range of adjustment. The sections are generally moveable from a flat, user resting position to a seated position with the legs bent or the legs straight and the occupant's back angled upwardly with respect to the seat section. The sections are pivoted by motor drives, hand operated cranks or through the user's weight. Other foundations are generally static. That is, the various frame sections are not pivotally interconnected and are typically of a one piece construction providing a fixed horizontal and planar surface. The foundation itself, whether it is for an adjustable foundation or for a static foundation, is typically elevated at a fixed height relative to ground by support legs.

BRIEF SUMMARY

Disclosed herein are adjustable mattress foundation and mattress assemblies and processes for operating the adjustable foundation.

In one or more embodiments, an adjustable foundation and mattress assembly includes a mattress having a top surface, a bottom surface, and an inner core between the top surface and the bottom surface, wherein the mattress has a width and a length; and an adjustable foundation for supporting the bottom surface of the mattress, the adjustable foundation comprising a foundation frame and an oversized deck attached to the foundation frame, wherein the deck has a width and a length that is substantially identical to the width and the length of the mattress and the foundation frame has a width that is less than the width of the mattress and a length that is substantially identical to the length of the mattress, wherein the oversized deck includes a mattress support surface including a head and back section hingedly connected to an intermediate seat section at one end and a leg and foot section hingedly connected to the intermediate seat section at another end, wherein the intermediate seat section includes a first portion and a second portion, wherein the first portion is hingedly connected to the head and back section and the second portion is hingedly connected to the leg and foot section.

A process for operating an adjustable mattress foundation, the process includes changing a position of a head and back section relative to an intermediate seat section of an adjustable mattress foundation, the adjustable mattress foundation including a foundation frame comprising side frame members and transverse frame members attached at respective ends of the side frame members to define a generally rectangular shape; a mattress support surface including the head and back section, the intermediate seat section and a leg and foot section, wherein the intermediate seat section includes an upper panel and a lower panel spaced apart from the upper panel, wherein the lower panel is hingedly connected to the head and back section and slidably engaged with the side frame members, and wherein the upper panel is stationary and hingedly connected to the leg and foot section; and a first linear actuator having an extending and retracting member operatively coupled to a first linkage assembly to independently effect inclination or declination of the head and back section relative to the intermediate seat section, wherein the first linear actuator is further operative to effect an increase or decrease in a length of the intermediate seat section by movement of the lower panel relative to the upper panel; and lengthening the intermediate seat section upon inclining the head and back section by moving the first portion away from the second portion; or shortening the intermediate seat section upon declining the head and back section by moving the first portion towards the second portion.

In one or more embodiments, an adjustable mattress foundation includes a foundation frame including side frame members and transverse frame members attached at respective ends with a corner bracket to define a generally rectangular shape, the corner bracket at an angle of about 45 degrees between the respective ends of the side frame members and the transverse frame members; and a foam block coupled to the corner bracket and having an arcuate shaped exterior portion projecting from the corner bracket.

The disclosure may be understood more readily by reference to the following detailed description of the various features of the disclosure and the examples included therein.

BRIEF DESCRIPTION OF THE SEVERAL VIEWS OF THE DRAWINGS

Referring now to the figures wherein the like elements are numbered alike.

DETAILED DESCRIPTION

The present disclosure is generally directed to mattress assemblies including a mattress supported by an adjustable foundation assembly. The adjustable foundation assembly includes an adjustable foundation frame having a rectangular shape of a standard dimension and an oversized deck including a head and back section, an intermediate seat section, and a leg and foot section supported by the foundation frame. That is, the deck has a width and a length that is substantially identical to the width and the length of the mattress and the foundation frame has a width that is less than the width of the mattress and a length that is substantially identical to the length of the mattress. In some mattress assembly embodiments, such as in the case of an extra-long mattress, the foundation frame has a length less than the length of the mattress in addition to being less than the width of the mattress. Accordingly, the mattress assemblies eliminate the need for two abutting adjustable foundation such as is commonly used with adjustable king sized mattress assemblies. As will be described in greater detail below, the oversized deck assembly can be attached to the foundation frame with minimal effort during home assembly.

Some of the more common standard bed sizes in the United States (American National Standard 2357.1-1981) published by the International Sleep Association are shown in Table 1 below.

TABLE 1

| TYPE | DIMENSIONS (W × L) |
| --- | --- |
| Twin | 38 inches × 75 inches |
| Twin Extra Long | 38 inches × 80 inches |
| Double | 54 inches × 75 inches |
| Double Extra Long | 54 inches × 80 inches |
| Queen | 60 inches × 80 inches |
| King | 76 inches × 80 inches |
| California King | 80 inches × 98 inches |

Figure 1:
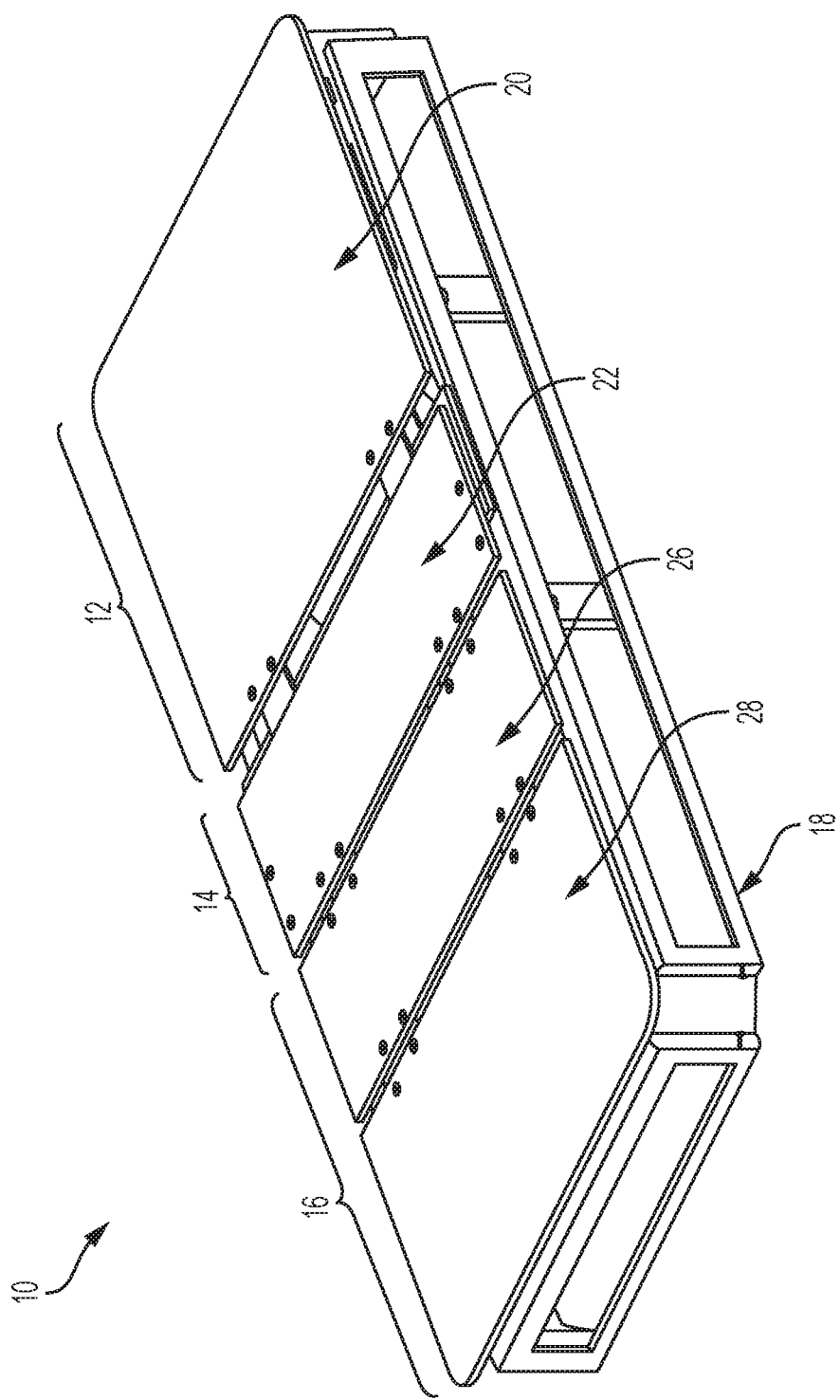
FIG. 1 ("FIG.") is a perspective view of an exemplary adjustable mattress foundation shown in a horizontal position in accordance with the present disclosure.
Figure 2:
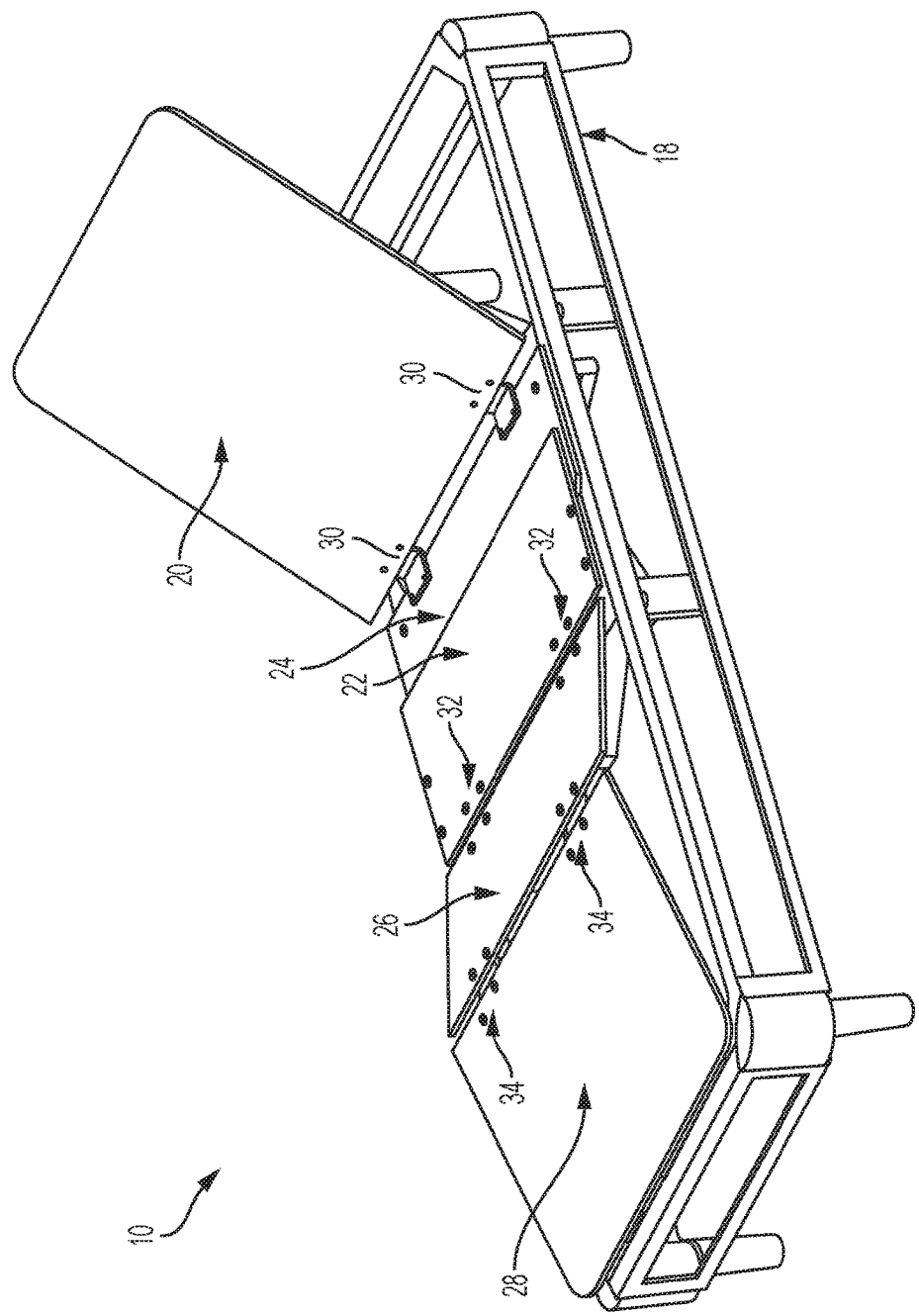
FIG. 2 is a perspective view of an exemplary adjustable mattress foundation shown in an inclined position in accordance with the present disclosure.
Figure 3:
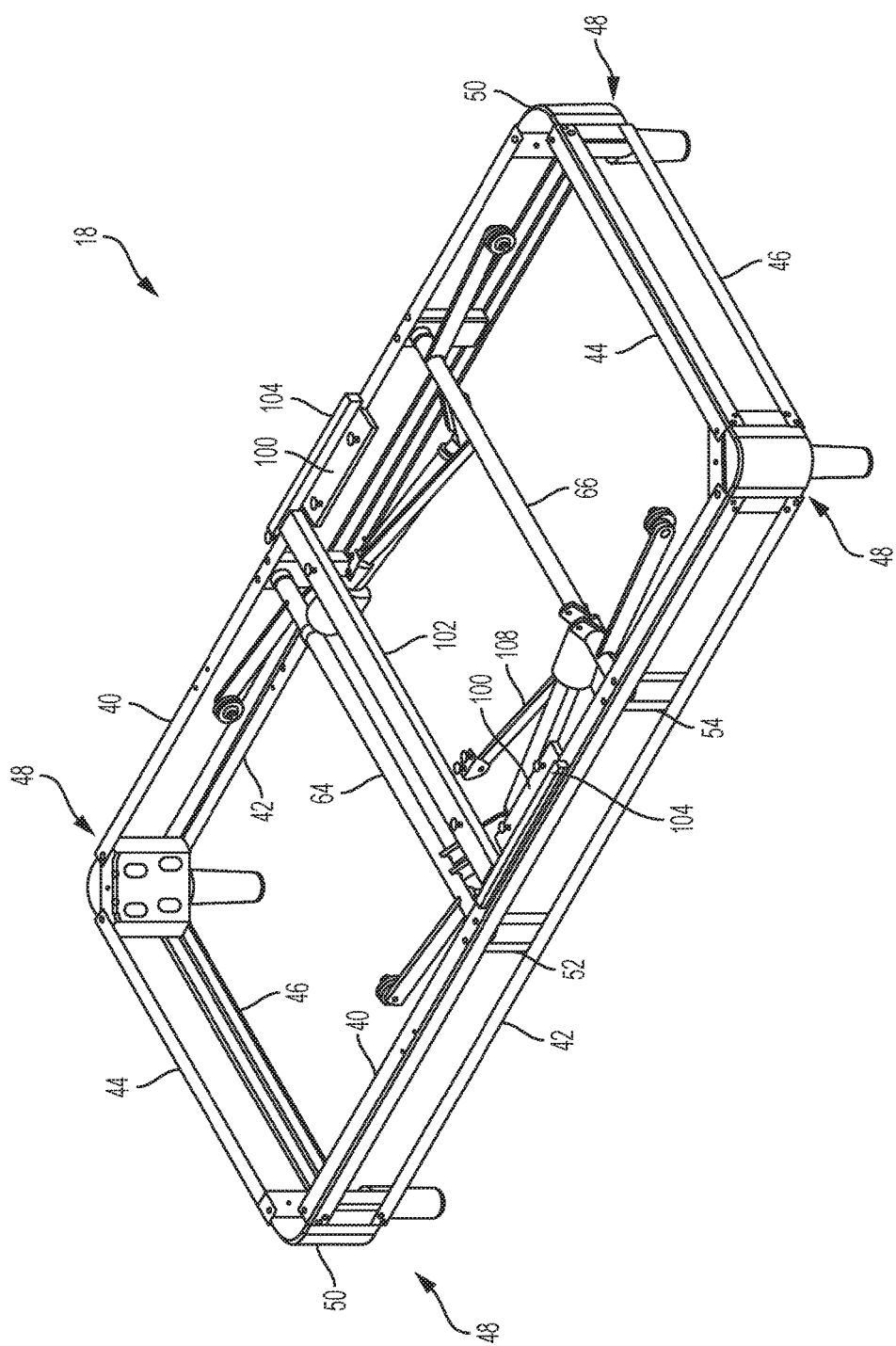
FIG. 3 is an isometric view of an adjustable foundation frame in accordance with the present disclosure.

Referring now to FIGS. 1-2, there are shown perspective views of an exemplary adjustable mattress foundation 10 including an adjustable deck suitable for use in the present disclosure.

The adjustable mattress foundation 10 is movable between a fully horizontal position as shown in FIG. 1 and an inclined position as shown in FIG. 2. The different positions are defined by a head and back section 12, a leg and foot section 16, and an intermediate seat section 14 therebetween, wherein the head and back section 12 and the leg and foot section 16 can articulate, i.e., elevate, relative to the intermediate seat section 14. The different sections, 12, 14, and 16 collectively form a mattress support surface upon which a mattress (not shown) is disposed. In the illustrated inclined position shown in FIG. 2, which is exemplary and not intended to be limiting, the head and back section 12 and the leg and foot section 16 are shown elevated relative to the intermediate seat section 14. An operator or user may lie prone on a mattress disposed on the adjustable mattress foundation 10 in its fully horizontal position, in the fully inclined position, or in any position therebetween. The adjustable mattress foundation 10 generally includes a rectangular shaped foundation frame 18, which supports and elevates the head and back section 12 and the leg and foot section 16, and the intermediate seat section 14, relative to ground.

The head and back section 12 can be formed of a single panel 20 whereas the intermediate seat section 14 as well as the leg and foot section 16 can be formed of two panels 22, 24 and 26, 28, respectively, as shown more clearly in FIG. 2. Panel 20 of the head section 12 is hingedly connected via hinges 30 to lower panel 24 of the intermediate seat section 14 at one end thereof. Likewise, the leg and foot section 16 includes panel 26 hingedly connected at one end via hinges 32 to panel 22 of the intermediate seat section 14 and at another end to panel 26 of the leg and foot section 16 via hinges 34, wherein panels 22, 24 of the intermediate seat section 14 are in a sliding relationship to selectively increase or decrease length of the intermediate section upon inclination or declination of the head section 12 and/or the leg and foot section 16. In the intermediate section 14, panel 22 is an upper panel and panel 24 is the lower panel. Additionally, panels 26 and 28 of the leg and foot section 18 are hingedly connected to one another via hinges 34.

Advantageously, the intermediate seat section 14 including upper and lower panels 22, 24, respectively, can be configured to collectively increase or decrease in length upon articulation of the head section 12 and/or the leg and foot section 18 from a flat position to an elevated position or vice versa. By doing so, a prone user does not have to shift his position on the mattress in order to accommodate the inclination or declination. Additionally, a mattress disposed thereon has been found to better contour to the shape provided by the different sections during articulation, which also helps minimize occupant pressure and shear.

The different sections 12, 14, and 16 are supported on a generally rectangular foundation frame 18, which includes a linkage assembly operable to selectively articulate the sections 12 and 16 relative to section 14 of the mattress support surface. In the present disclosure, the linkage assembly is not intended to be limited. An exemplary linkage assembly and adjustable foundation is described in U.S. Pat. No. 5,870,784, incorporated herein by reference in its entirety.

FIGS. 3-6 depict an exemplary linkage assembly for use in the present disclosure. However, the present disclosure is not intended to be limited to any particular linkage assembly. Other exemplary linkage assemblies and adjustable foundations are described in U.S. Pat. No. 5,870,784, incorporated herein by reference in its entirety.

As shown in FIGS. 3-6, the generally rectangular foundation frame 18 generally includes upper and lower side frame members 40, 42, respectively, upper and lower transverse frame members 44, 46, respectively, attached to respective ends of the side frame members 40, 42 to define the generally rectangular shape to the foundation frame 18, and support legs 48 at corners of the foundation frame 18 for elevating the various sections 12, 14, 16 shown in FIGS. 1-2 coupled thereto relative to ground. The support legs 48 may be secured at corners to the frame members and can include an arcuate shaped foam block 50 attached thereto to provide padding at the corners of the foundation frame 18.

The upper and lower side frame members 40, 42 further include two pairs of pillars 52, 54 spaced apart from one another coupled to the upper and lower side frame members 30, 32. The pairs of pillars 42, 44 are configured to receive torsional members 46, 48 transversely extending between the side members 30, 32, which are operative with a linkage assembly described in greater detail below to articulate sections 12 and/or 16 of the adjustable mattress foundation 18.

Figure 4:
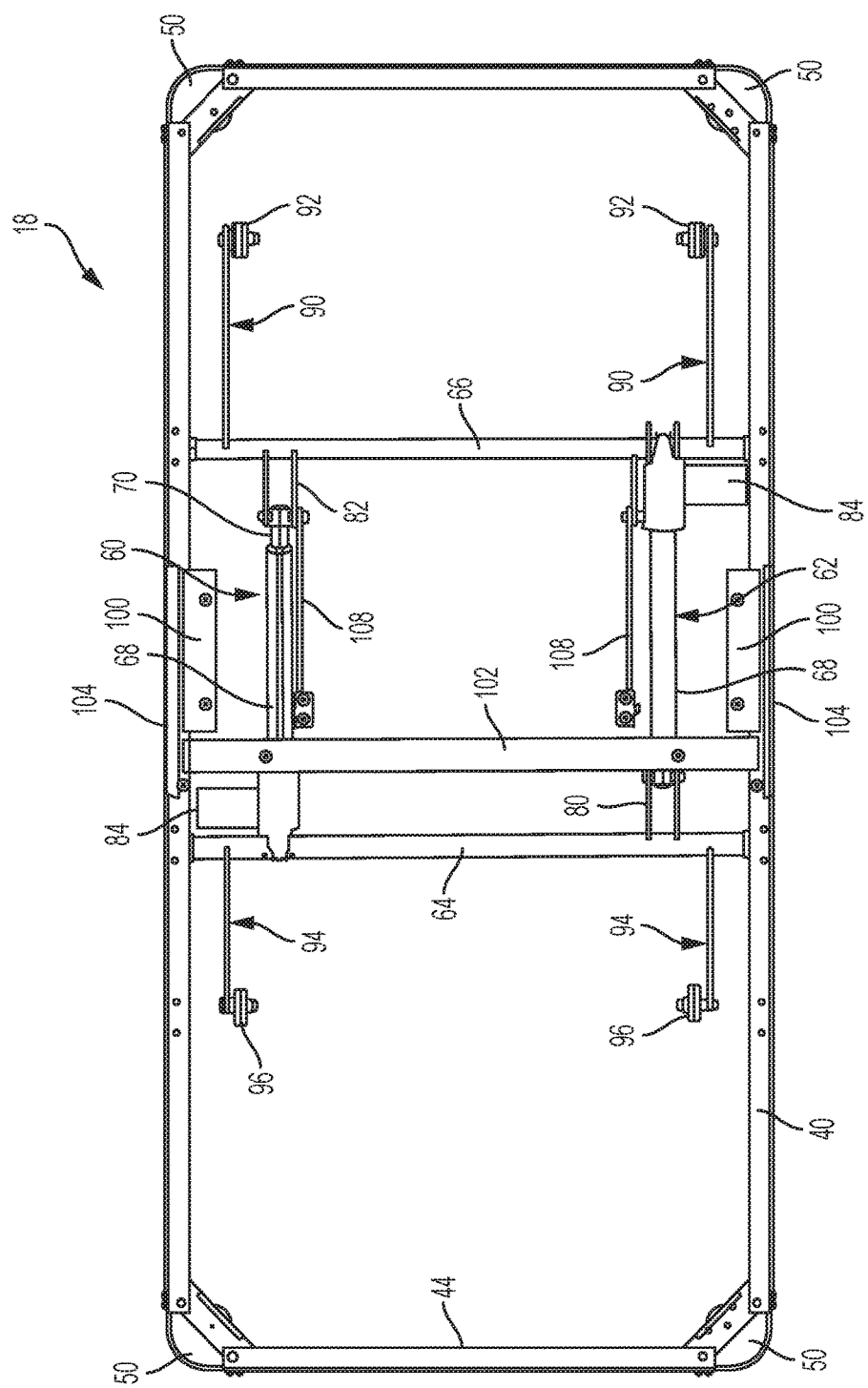
FIG. 4 is a top plan view of an adjustable foundation frame in accordance with the present disclosure.
Figure 5:
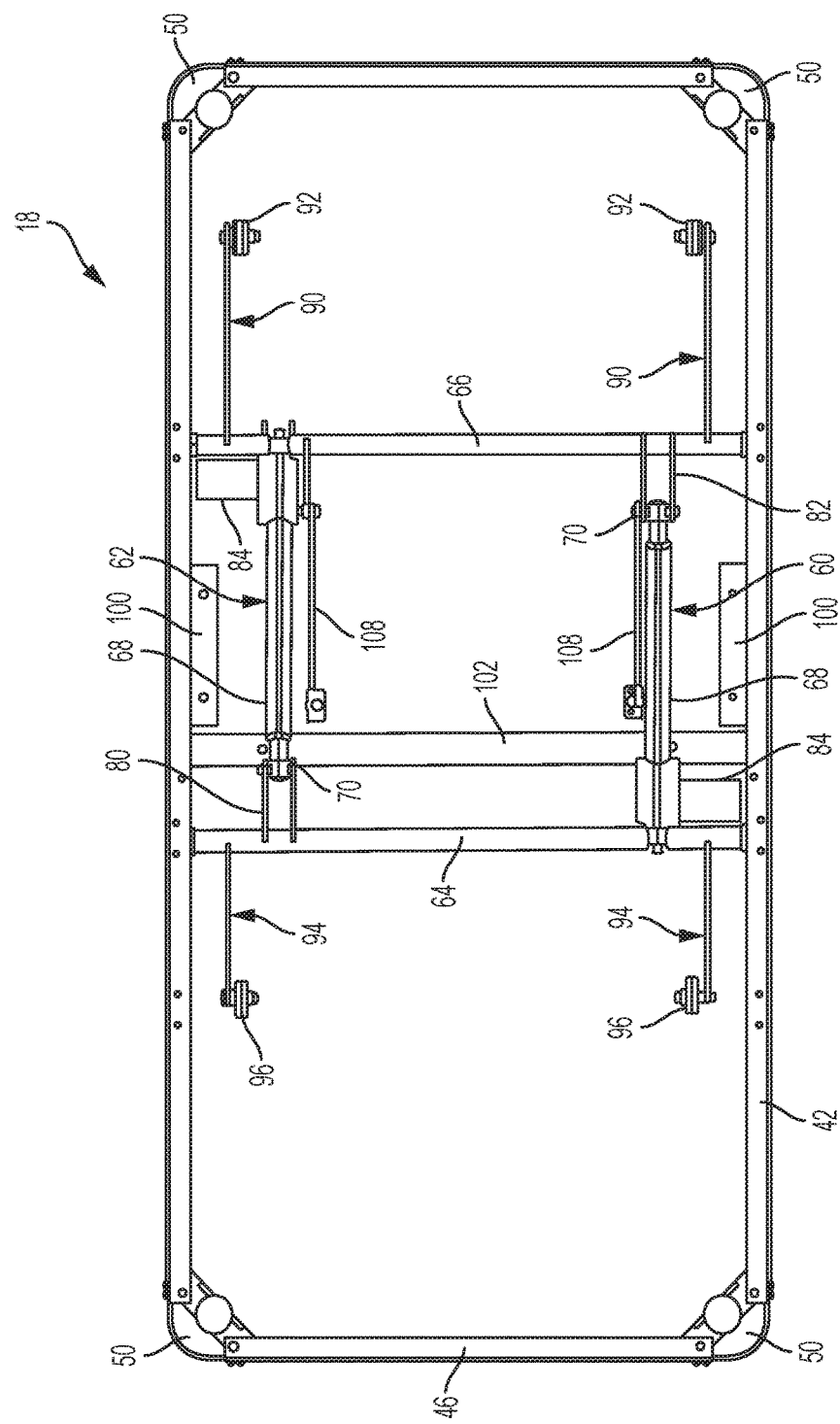
FIG. 5 is a bottom plan view of an adjustable foundation in an horizontal position in accordance with the present disclosure.
Figure 6:
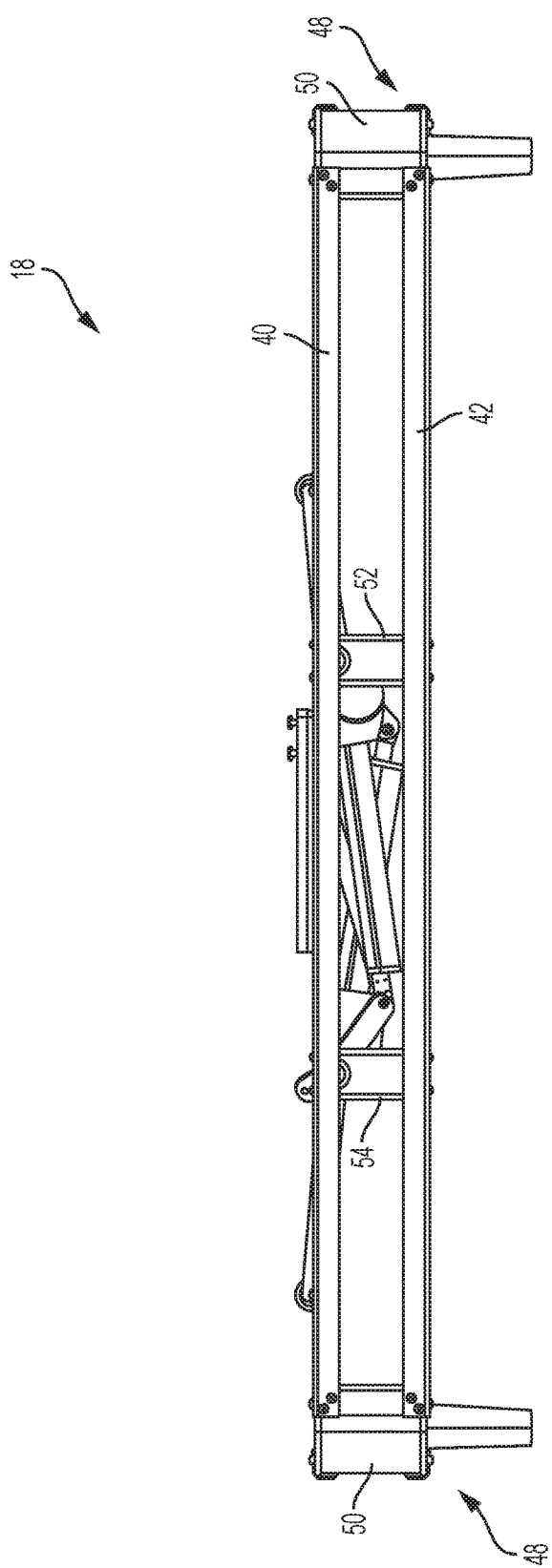
FIG. 6 is a side plan view of an adjustable foundation in a flat position in accordance with the present disclosure.

Linear actuators 60, 62 shown more clearly in FIGS. 4-5 are attached to the torsional members 64, 66. The linear actuators 60, 62 generally include a body portion 68 and a piston 70 that can movably extend or retract relative to the body portion 68. Linear actuator 60 is oriented such that the body portion 68 is coupled to torsional member 66 and the piston 70 is coupled to crank arms 80 on torsional member 64 such that translation of the linear actuator 50 effects rotation of torsional member 64. Linear actuator 62 is oriented such that the body portion 68 is coupled of torsional member 64 and the piston 70 is coupled to crank arm 82 on torsional member 66 such that accusation of the linear actuator 62 effects rotation of torsional member 66. Each of the linear actuators 60, 62 include a motor 84 effective to create actuator motion so as to rotate the respective torsional member 64 and/or 66 upon extension and retraction of the respective linear actuator 60 and/or 62. In some instances, simultaneous rotation of both torsional members 64, 66 can be configured to occur such as when the head and back section 12 and the foot and leg section 16 are articulated at the same time. At other times, selective rotation of one of the torsional members 64 or 66 will occur. For example, selective rotation of torsional member 64 by actuation of linear actuator 60 will result in inclination or declination of the leg and foot section 16. Likewise, selective rotation of torsional member 66 by actuation of linear actuator 62 will result in inclination or declination of the head and back section 12.

A pair of roller arms 90 is coupled to torsional member 66, wherein each roller arm 90 includes a roller 92 at a free end. The roller arms 90 are spaced apart from one another and are configured to contact panel 20 of the head and back section 12. In this manner, upon actuation of the linear actuator 60 to effect rotational movement of the torsional member 66, the rollers 92 of the roller arms 90 are configured to contact panel 20 to provide inclination or declination of the head section 12. Similarly, a pair of roller arms 94 is coupled to torsional member 64, wherein each roller arm 94 includes a roller 96 at the free end. The roller arms 94 are spaced apart from one another and the rollers 96 attached thereto are configured to contact panel 26 of the foot and leg section 16. In this manner, upon actuation of the linear actuator 62 to effect rotational movement of the torsional member 64, the rollers 96 contact panel 26 to provide inclination or declination thereof. Because panel 26 is hingedly connected to panel 28, both panels 26, 28 in the leg and foot section 16 will incline or decline upon actuation of linear actuator 66.

Figure 7:
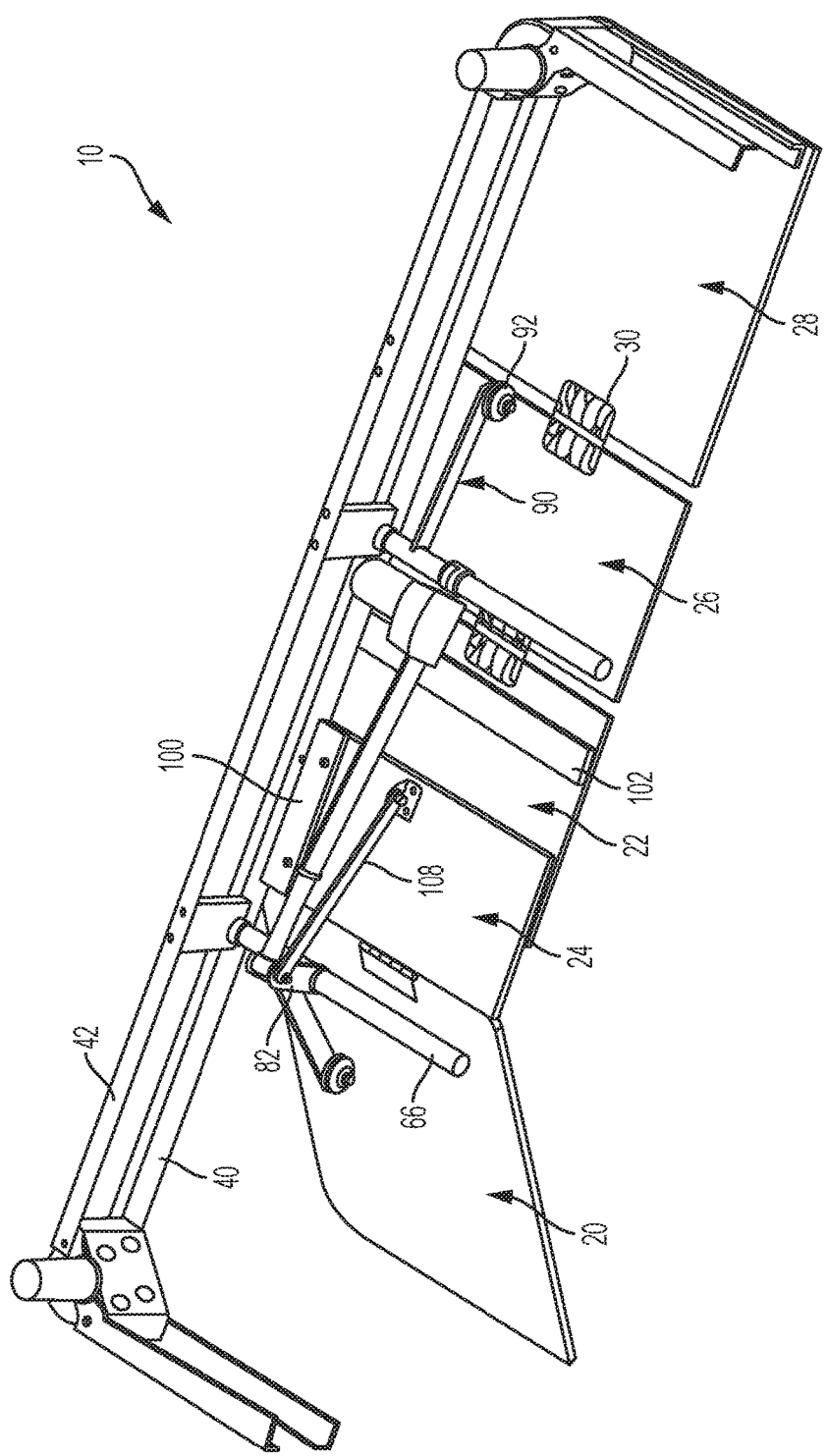
FIG. 7 is a isometric bottom cut-away view of an adjustable foundation frame in accordance with the present disclosure.

As initially shown in FIG. 2, the intermediate seat section 14 includes upper and lower panels 22, 24, respectively, wherein upper panel 22 is spaced apart from and in a sliding relationship relative to lower panel 24. As shown more clearly in FIGS. 3-4 and the partial bottom isometric view of FIG. 7, lower panel 24 is coupled to and supported on linear slide plate 100, which is slideably engaged with upper side members 40 and located intermediate torsional members 64, 66. The linear slide plate 100 is fabricated from a low friction material and configured to slideably engage the upper side frame member 40. By way of example, the upper side member 40 can be angle iron having an L-shaped cross section and the linear slide plate may include a channel engageable with the angle iron. Upon articulation of the head section 12, the lower panel 24 slides along the upper side frame members 40 to lengthen or shorten the intermediate seat section 14.

The upper panel 22 is attached at one end along its length to cross member 102. Additionally, the upper panel 22 is seated on and attached at each end along its width to spacers 104 positioned proximate to the slide plate 80 and disposed on the upper side members 40. The upper panel 22 is coplanar to the other panels 20, 26 and 28. By attaching the upper panel 22 to the cross member 84 and to the spacers 82 disposed on the side frame members 40, upper panel 22 can be spaced apart from the lower panel 24. It should be apparent that upper panel 22 of the intermediate seat section 14 is statically positioned during operation, i.e., does not translate from a fixed stationary position. In contrast, the lower panel 24 is in sliding engagement with the linear slide 100 upon articulation of the head and back section 12 to lengthen or shorten the intermediate seat section 14. It should also be apparent that an applied load on the lower panel 24 during use is minimal given the spaced relationship of the upper panel relative to the lower panel as well as the load surface area provided by the upper panel 22, which will carry the bulk of the applied load on the intermediate seat section 14 during use.

Referring back to FIG. 7, a second pair of crank arms 106 is attached to and paced apart on torsional member 66. Link arms 108 are pivotably attached at one end to the crank arms 82 to define a pivot point therewith and to the lower panel 24 of the intermediate seat portion 14. Upon inclination/declination of the head and back section 12, which includes panel 20 hingedly connected to the lower panel 24, the torsional member 66 will rotate as a consequence of the extension/retraction of the linear actuator 60, which will move the lower panel 24 relative to the upper panel 22 simultaneously with inclining or declining panel 20 of the head and back section 12, thereby increasing or decreasing the length of the intermediate seat section 14.

Upon inclination of the head and back section 12, lower panel 24 will slide towards the head end of the foundation 10, thereby elongating the intermediate seat section 14. Maximum elongation of the intermediate seat section 14 will occur upon maximum inclination of the head and back section 12. As such, the above mechanism and configuration permits "wall hugging" placement of the adjustable foundation since the head and back section 12 pivots about a fixed axis defined by torsional member 48 and the motion and extension of the lower panel 24 of the intermediate seat section 14 causes the head and section 12 to slide towards the wall, i.e., towards a head end of the adjustable mattress foundation. By doing so, the adjustable mattress assembly, if having the head end abutting a wall, will cause the head and back section 18 to "wall hug", i.e., stay in close proximity to the wall regardless of inclination angle. Advantageously, this permits constant and easy access to a night table that may be disposed adjacent to the head and back section.

Figure 8:
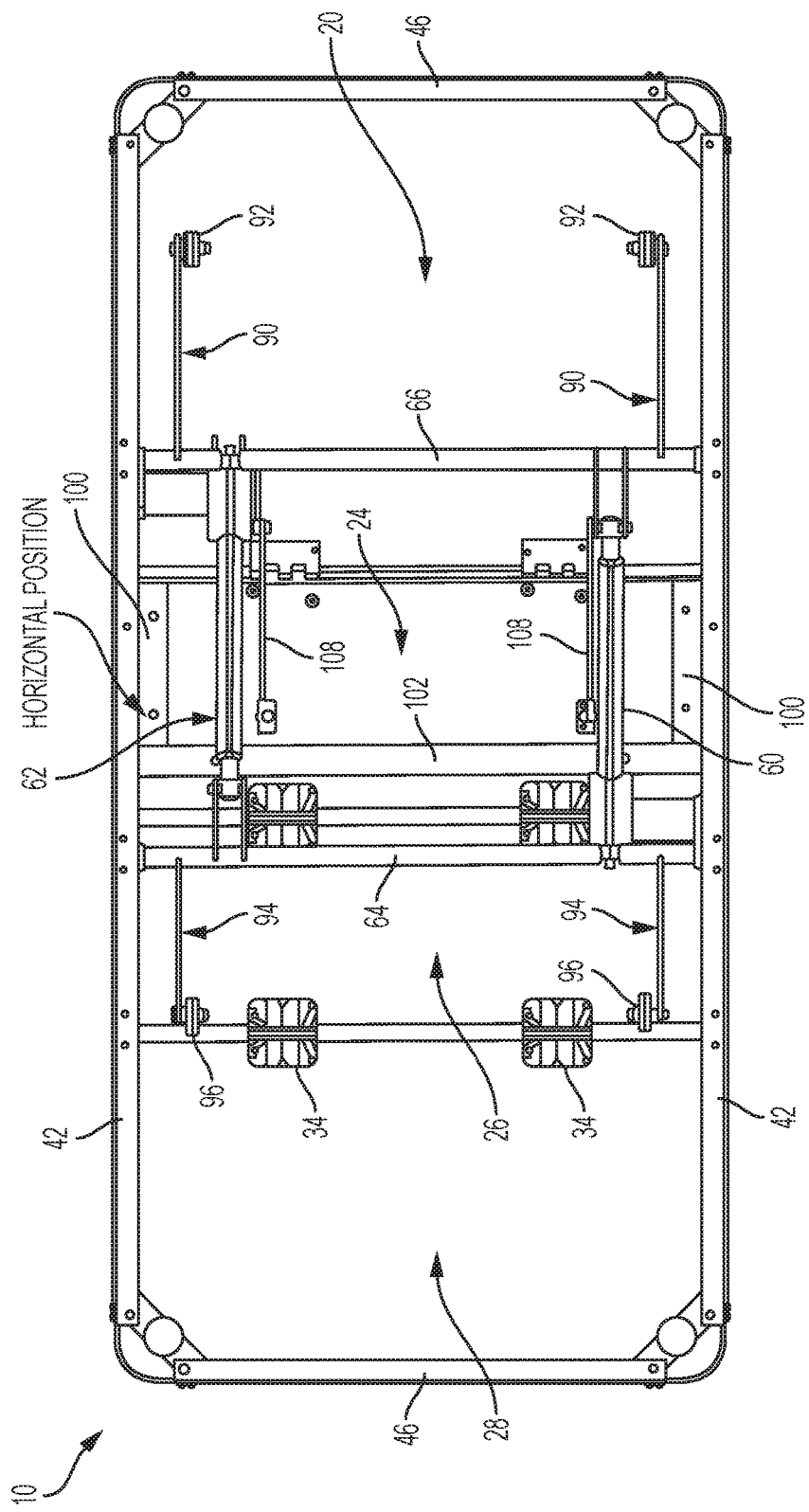
FIG. 8 is a bottom view of an adjustable mattress foundation, wherein the head and back section is in a horizontal position.
Figure 9:
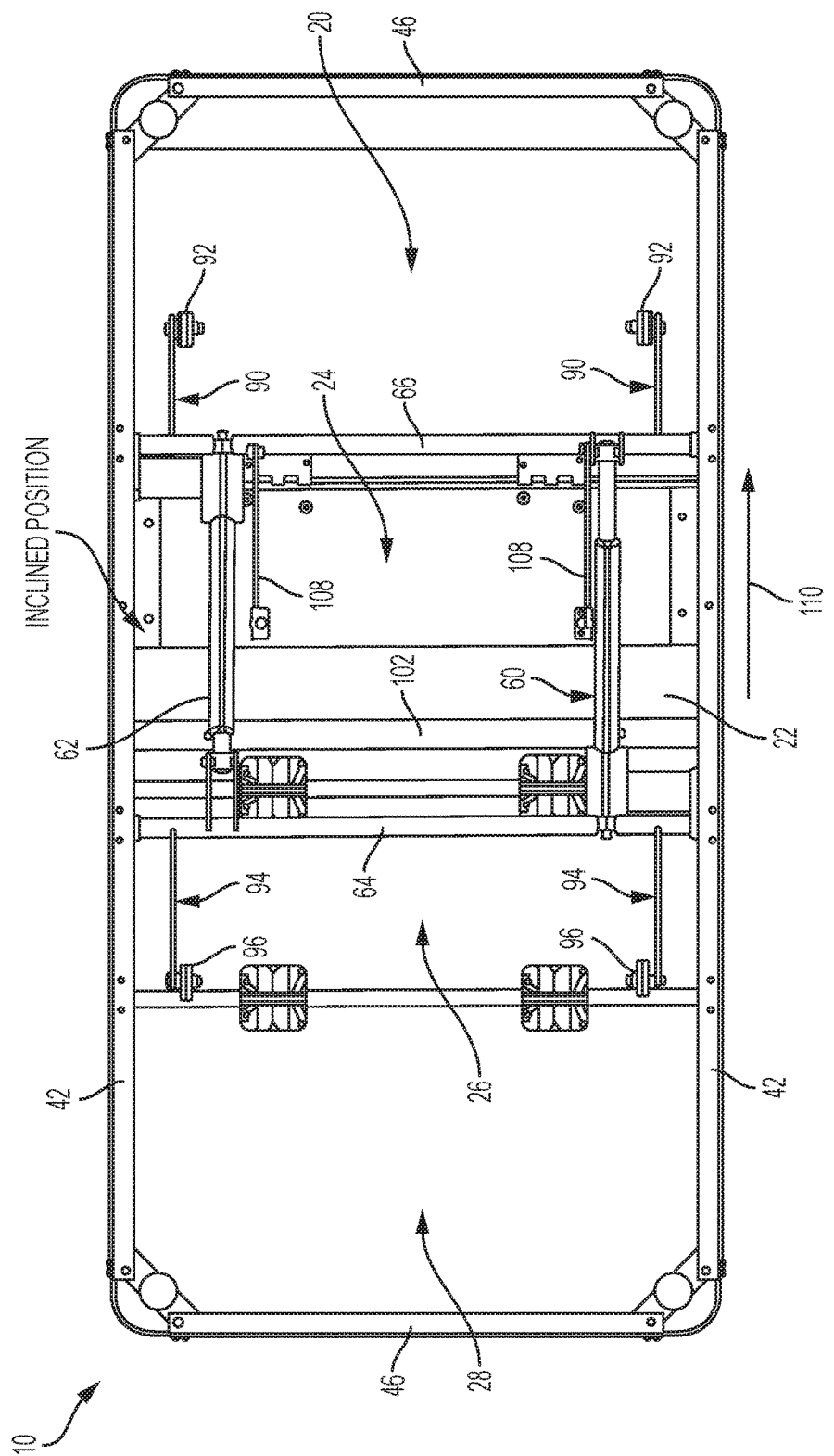
FIG. 9 is a bottom view of an adjustable mattress foundation, wherein the head and back section is in an inclined position.

Turning now to FIGS. 8-9, there are shown bottom views of the adjustable mattress foundation 10 and wherein the head and back section 12 is in a horizontal position and an inclined position, respectively. In the horizontal position, panels 20, 24, 26 and 28 are coplanar to one another. Lower panel 24 of the intermediate seat section 14 is positioned substantially underneath upper panel 22 of the intermediate seat section to define a first overall length dimension. Upon actuation of linear actuator 60, translation of the piston therein causes rotation of torsional member 66, which moves the roller arms 90 upwards relative to ground causing the rollers 92 to raise panel 20 relative to the intermediate seat section 14. Raising panel 20 in this manner causes link arm 108 to pivot about the pivot point on the crank arms 82 to effectively pull lower panel 24 a distance away from its original location. The linear slide of the lower panel 24 engageably slides along the angle iron of the upper side frame member 40 to move in the direction as indicated by arrow 110 in FIG. 9 to provide the intermediate seat section with a second overall length dimension, wherein the second overall length dimension is greater than the first overall length dimension when the head section 12 is in a horizontal position.

Optionally, any of the sections 12, 14, and 16 of the adjustable foundation can be modified to include a vibratory unit.

Figure 10:
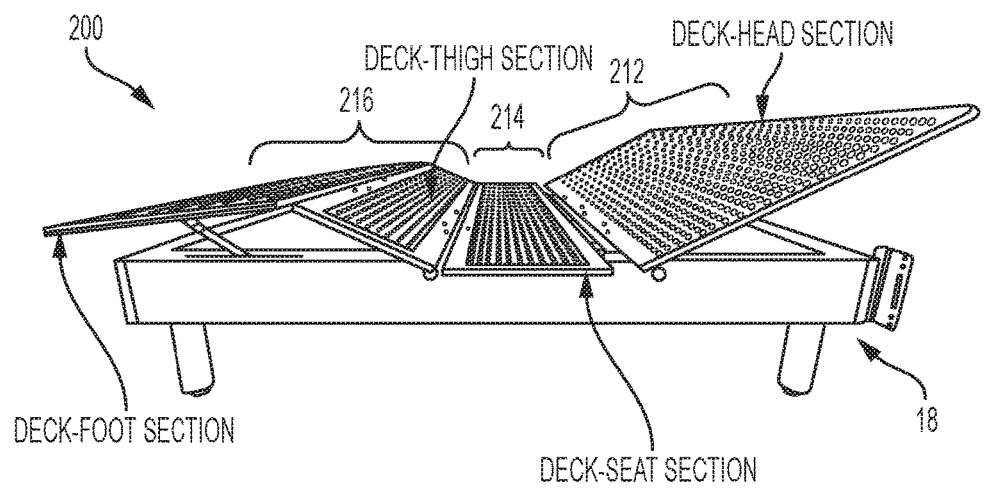
FIG. 10 is a side perspective view of an adjustable foundation assembly including an oversized deck in accordance with one or more embodiments of the present disclosure.

FIG. 10 provides a side perspective view of the adjustable foundation 200 in accordance with the present disclosure, wherein the deck has a width and a length that is configured to be substantially identical to the width and the length of the mattress and the foundation frame has a width that is less than the width of the mattress and a length that is substantially identical to the length of the mattress.

As shown, the deck includes a head and back section 212, a leg and foot section 216, and an intermediate seat section 214 therebetween, wherein the head and back section 212 and the leg and foot section 216 can articulate, i.e., elevate, relative to the intermediate seat section 214. The different sections, 212, 214, and 216 collectively form a mattress support surface upon which a substantially identically sized mattress (not shown) is disposed. The adjustable mattress foundation 200 generally includes a rectangular shaped foundation frame such as the one previously described above, e.g., 18, which supports and elevates the head and back section 212 and the leg and foot section 216, and the intermediate seat section 214, relative to ground. The different sections 212, 214, and 216 can be attached to the linkage assembly in the manner described above.

Figure 11:
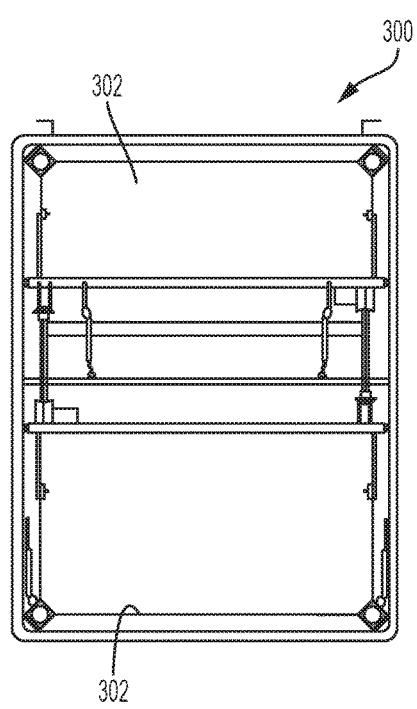
FIG. 11 is a bottom view of an adjustable foundation assembly including a queen sized foundation frame and a queen sided deck.
Figure 12:
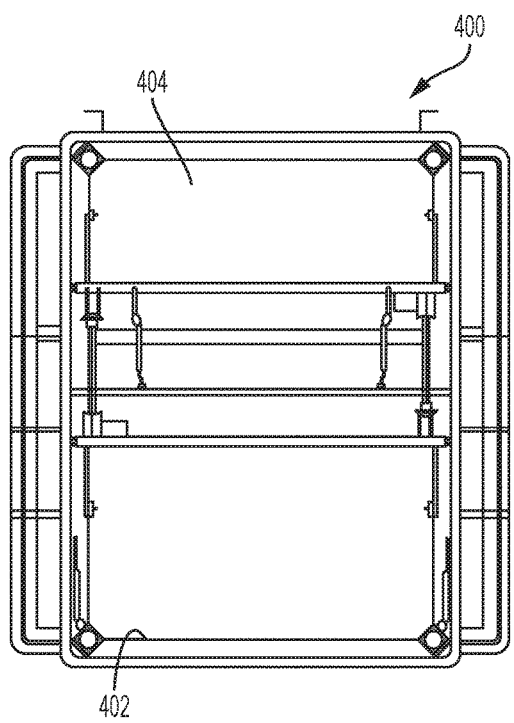
FIG. 12 is a bottom view of an adjustable foundation assembly including a queen sized foundation frame and a king sided deck in accordance with the present disclosure.

FIGS. 11 and 12 provides bottom views of a queen-sized foundation assembly 300 and a king sized foundation assembly 400, respectively. The queen sized foundation assembly 300 includes foundation frame 302 and deck 304 (including the different adjustable sections described above) having length and width dimensions substantially identical to a queen size mattress. In contrast, the king sized foundation assembly 400 includes foundation frame 402 and deck 404 (including the different adjustable sections described above), wherein the foundation frame has length and width dimensions substantially identical to a queen size mattress and the deck has a length and width dimension substantially identical to a king size mattress. That is, the king sized foundation assembly has a foundation frame having a width dimension less than a width dimension of the king sized mattress and a length dimension substantially identical to the length dimension of the king sized mattress.

The deck including the various section can be formed from a variety of materials including, but not limited to structural foam, composite materials, laminated honeycomb material formed paper, e.g., cardboard, high pressure laminates, and the like.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An adjustable foundation and mattress assembly, comprising:

a mattress having a top surface, a bottom surface, and an inner core between the top surface and the bottom surface, wherein the mattress has a width and a length; and an adjustable foundation for supporting the bottom surface of the mattress, the adjustable foundation comprising a foundation frame and an oversized deck attached to the foundation frame, wherein the deck has a width and a length that is substantially identical to the width and the length of the mattress and the foundation frame has a width that is less than the width of the mattress and a length that is substantially identical to the length of the mattress, wherein the oversized deck comprises a mattress support surface including a head and back section hingedly connected to an intermediate seat section at one end and a leg and foot section hingedly connected to the intermediate seat section at another end, wherein the intermediate seat section includes a separate first portion and a separate second portion, wherein the first portion is hingedly connected to the head and back section and the second portion is hingedly connected to the leg and foot section.

2. The adjustable foundation and mattress assembly of claim 1, wherein the length and width of the deck is substantially identical to a king sized mattress and the length and width of the foundation is substantially identical to a queen sized mattress.

3. The adjustable foundation and mattress assembly of claim 1, deck comprises a laminated honeycomb material.

4. The adjustable foundation and mattress assembly of claim 1, deck comprises a structural foam.

5. The adjustable foundation and mattress assembly of claim 1, wherein the foundation frame comprises side frame members and transverse frame members attached at respective ends to define a generally rectangular shape; and wherein the first portion of the intermediate seat section is an upper panel and the second portion is a lower panel spaced apart from the upper panel, wherein the lower panel is hingedly connected to the head and back section and slidably engaged with the side frame members, and wherein the upper panel is stationary and hingedly connected to the leg and foot section; and a first linear actuator having an extending and retracting member operatively coupled to a first linkage assembly to independently effect inclination or declination of the head and back section relative to the intermediate seat section, wherein the first linear actuator is further operative to effect an increase or decrease in a length of the intermediate seat section by movement of the lower panel relative to the upper panel.

6. The adjustable mattress foundation of claim 5, further comprising:

a second linear actuator having an extending and retracting member operatively coupled to a second linkage assembly to independently effect inclination or declination of the foot and leg section.

7. The adjustable mattress foundation of claim 5, wherein the side frame member is an angle iron having an L-shaped cross section, and wherein the lower panel is coupled to a linear slide plate including a channel adapted to slideably engage a portion of the L-shaped cross section.

8. The adjustable mattress foundation of claim 5, wherein the upper panel is spaced apart from the lower panel by a spacer.

9. The adjustable mattress foundation of claim 5, wherein the head and back section comprises a single panel, and the leg and foot section comprises a first panel hingeably connected to a second panel.

10. A process for operating an adjustable mattress foundation, the process comprising:
    changing a position of a head and back section relative to an intermediate seat section of an adjustable mattress foundation, the adjustable mattress foundation comprising a foundation frame comprising side frame members and transverse frame members attached at respective ends of the side frame members to define a generally rectangular shape; a mattress support surface including the head and back section, the intermediate seat section and a leg and foot section, wherein the intermediate seat section includes an upper panel and a lower panel spaced apart from the upper panel, wherein the lower panel is hingedly connected to the head and back section and slidably engaged with the side frame members, and wherein the upper panel is stationary and hingedly connected to the leg and foot section; and a first linear actuator having an extending and retracting member operatively coupled to a first linkage assembly to independently effect inclination or declination of the head and back section relative to the intermediate seat section, wherein the first linear actuator is further operative to effect an increase or decrease in a length of the intermediate seat section by movement of the lower panel relative to the upper panel; and
    lengthening the intermediate seat section upon inclining the head and back section by moving the first portion away from the second portion; or
    shortening the intermediate seat section upon declining the head and back section by moving the first portion towards the second portion.

11. The process of claim 10, wherein changing the position of the head and back section relative to the intermediate seat section simultaneously changes a position of the leg and foot section relative to the intermediate seat section.

12. The process of claim 10, wherein simultaneously changing the positions of the head and back section and the leg and foot section comprises actuating a second actuator operatively coupled and linked thereto.

13. The process of claim 10, wherein changing the position of the head and back section relative to the intermediate seat section is independent from changing a position of the leg and foot section.

14. The process of claim 10, wherein lengthening the intermediate seat section causes the head and back section to slide towards a head end of the adjustable mattress foundation.

15. An adjustable mattress foundation, comprising:
    a foundation frame comprising side frame members and transverse frame members attached at respective ends with a corner bracket to define a generally rectangular shape, the corner bracket at an angle of about 45 degrees between the respective ends of the side frame members and the transverse frame members; and
    a foam block coupled to the corner bracket and having an arcuate shaped exterior portion projecting from the corner bracket.

* * * * *